Jan. 7, 1930.  H. E. WEBB ET AL  1,742,675
NECKWEAR TRY FORM
Filed Dec. 9, 1927  2 Sheets-Sheet 1
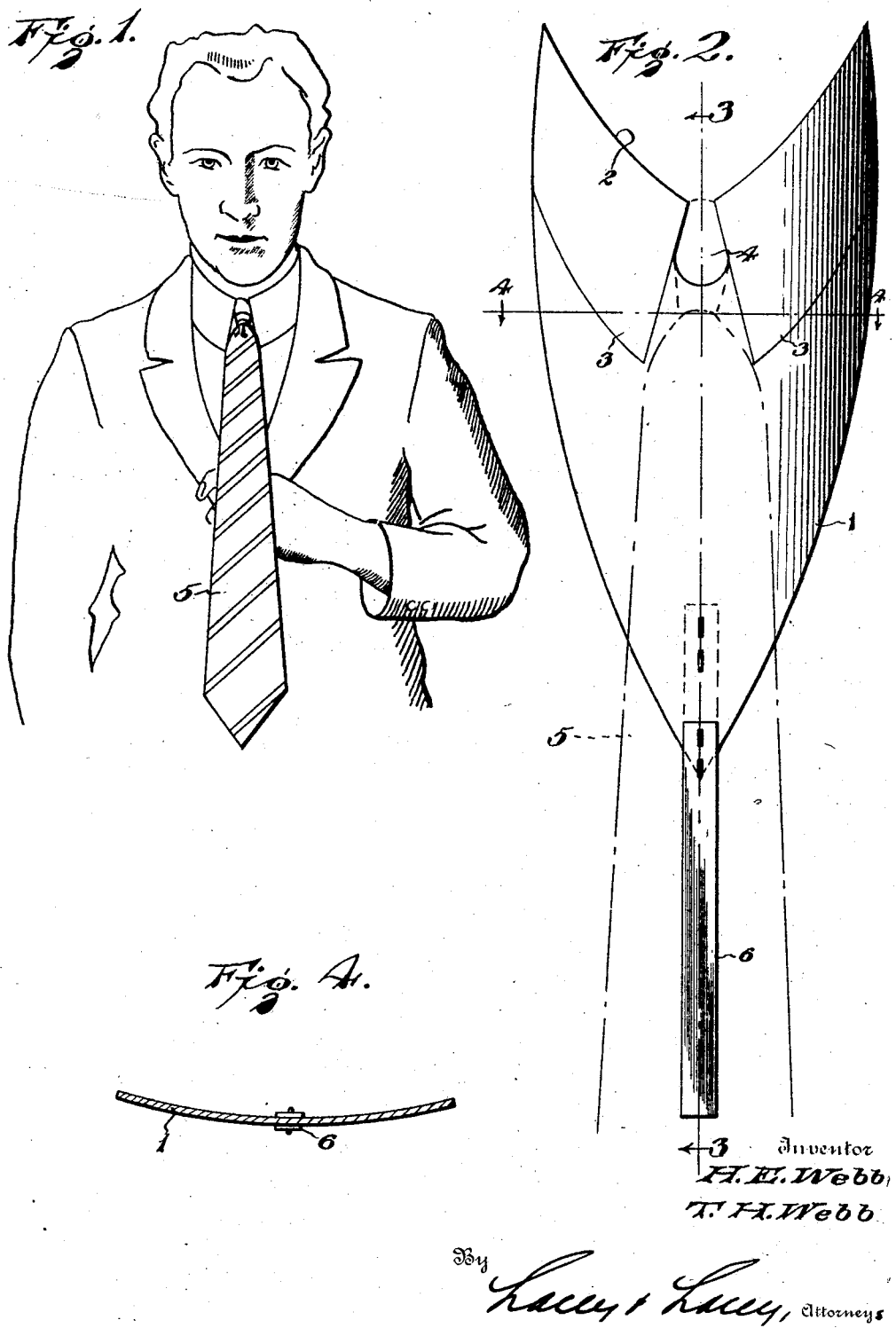

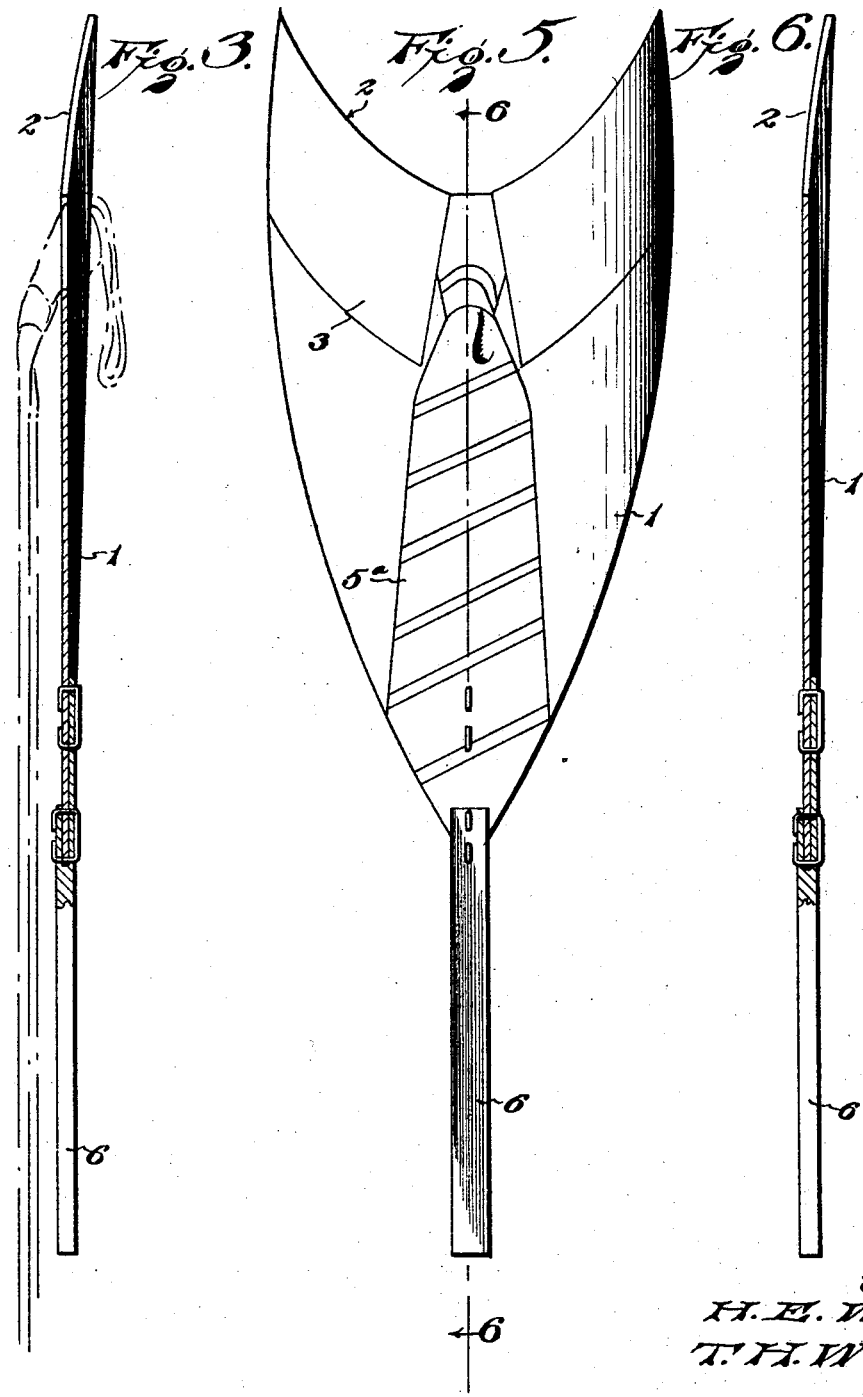

Patented Jan. 7, 1930

1,742,675

UNITED STATES PATENT OFFICE

HARRY E. WEBB AND THOMAS H. WEBB, OF NEW YORK, N. Y.

NECKWEAR TRY FORM

Application filed December 9, 1927. Serial No. 238,965.

This invention supplies a form whereby one may select a collar or necktie best adapted to the taste, appearance and style of the person making the selection.

The invention enables a purchaser to try out the article, thereby affording opportunity to judge of its fitness and adaptability as to the appearance, fancy and liking of the customer.

The invention consists of a flat body, preferably of tapering configuration, having a depression in its top edge to conform to the human neck, and having the meeting ends of a collar delineated or otherwise provided at its top edge adjacent the depression, and having provision for a necktie which may be by imprint on the body or means for the attachment of a tie thereto.

While the drawings illustrate a preferred embodiment of the invention it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which—

Figure 1 is a front view of an embodiment of the invention illustrating an application thereof.

Figure 2 is a similar view of the device, the position of the necktie when applied being indicated by the dotted lines.

Figure 3 is a sectional view on the line 3—3 of Figure 2, looking to the left as indicated by the arrows.

Figure 4 is a detail sectional view on the line 4—4 of Figure 2, looking downwardly as designated by the arrows.

Figure 5 is a front view of a modification.

Figure 6 is a sectional view on the line 6—6 of Figure 5.

Corresponding and like parts are referred to in the following description and designated in the several views of the drawings by like reference characters.

The form comprises a flat body 1 which usually consists of sheet material, such as card board, celluloid, or the like. The form is elongated and preferably of tapering outline, as indicated most clearly in Figures 2 and 5 of the drawings, and represents the bosom portion of a shirt. A depression 2 is provided in the top edge of the form 1 and its shape conforms to the human neck when the form is positioned against the chest of the person when the device is in actual service to enable the selection of a collar, necktie, or similar article of neckwear. The tapering configuration of the form corresponds approximately to the opening of a vest or top coat when buttoned about the person, as indicated most clearly in Figure 1 of the accompanying drawings. As indicated in Figure 4 of the drawings, the form curves transversely, so as to fit close against the chest of the person to exhibit the article being tried to the best advantage. The end portions 3 of a collar appear at the top of the form adjacent the depression 2 and are preferably delineated thereon. Obviously, these ends may be provided in any determinate way and the outline will vary to suit the various styles of collars. In the preferable form an opening 4 is provided in the top end of the body 1, midway between the ends of the depression 2 and opposite the space defined by the meeting ends 3 of the collar. The bottom edge of the opening 4 is round, whereas the side edges are upwardly converged to conform to the extremities of the collar and to provide means for retaining the necktie 5 in place when applied to the form, the upper portion of the knot being passed through the opening 4 as indicated most clearly by the dotted lines in Figure 3.

It is understood that a form is provided for each style of collar, thereby enabling a person to try the different styles so as to select that best adapted to his appearance, mien and fancy. For convenience of manipulating the form a handle 6 is attached to the lower tapered end thereof. It is observed that the form provides means for trying different neckties, so that the person may select that which is best adapted to the style of collar, and to suit the ideas and liking of the one making the selection.

In the modification shown in Figures 5 and 6 the numeral 5ª denotes the representation of a necktie which is imprinted or otherwise provided upon the form. This adaptation of the invention is intended solely to facilitate the selection of a collar so that the person making the selection may judge of the fitness of any particular style of collar. When using the form, it is placed against the chest with the depressed upper edge 2 fitting close about the neck, thereby enabling the one to determine which style is best adapted and appropriate for the occasion.

Having thus described the invention, we claim:

1. A try-out form for collars and analogous articles of personal wear, the same consisting of a flat body representative of the bosom portion of a shirt and adapted to be fitted snugly against the breast of the person and provided in its top edge with a curved depression conforming to the neck to obtain a close fit thereagainst, and provided at its top edge bordering upon the depression with the representation of the meeting ends of a collar for the display of a necktie opposite the space defined by the meeting ends of the collar.

2. A try-out form for collars and neckties, the same consisting of a flat body having a depression in its top edge curved to conform to the human neck and having the representation of the meeting ends of a collar bordering upon said depression, and having an opening midway of the depression and opposite the space formed between the meeting collar ends adapted to receive the knot portion of a necktie.

3. A try-out form for collars and neckties, the same consisting of a flat body having a depression in its top edge curved to conform to the human neck and having the representation of the meeting ends of a collar bordering upon said depression, and having an opening midway of the depression and opposite the space formed between the meeting collar ends adapted to receive the knot portion of a necktie, the lower end of the opening being round and its sides upwardly converged to engage and retain the knot of the necktie in place within the opening.

In testimony whereof we affix our signatures.

HARRY E. WEBB. [L. S.]
THOMAS H. WEBB. [L. S.]